US012564895B2

(12) United States Patent
Hranka

(10) Patent No.: US 12,564,895 B2
(45) Date of Patent: Mar. 3, 2026

(54) WIRE ARC HYBRID MANUFACTURING

(71) Applicant: Karl F. Hranka, Spearfish, SD (US)

(72) Inventor: Karl F. Hranka, Spearfish, SD (US)

( * ) Notice: Subject to any disclaimer, the term of this patent is extended or adjusted under 35 U.S.C. 154(b) by 901 days.

(21) Appl. No.: 17/833,277

(22) Filed: Jun. 6, 2022

(65) Prior Publication Data

US 2022/0297215 A1 Sep. 22, 2022

Related U.S. Application Data

(62) Division of application No. 16/162,217, filed on Oct. 16, 2018, now Pat. No. 11,383,316.

(60) Provisional application No. 62/572,758, filed on Oct. 16, 2017, provisional application No. 62/572,717, filed on Oct. 16, 2017.

(51) Int. Cl.
| | |
|---|---|
| *B23K 9/04* | (2006.01) |
| *B23K 9/12* | (2006.01) |
| *B23K 9/133* | (2006.01) |
| *B23K 9/28* | (2006.01) |
| *B23K 9/32* | (2006.01) |
| *B23K 35/02* | (2006.01) |

(52) U.S. Cl.
CPC .............. *B23K 9/044* (2013.01); *B23K 9/125* (2013.01); *B23K 9/133* (2013.01); *B23K 9/287* (2013.01); *B23K 9/324* (2013.01); *B23K 35/0261* (2013.01); *B23K 35/0244* (2013.01)

(58) Field of Classification Search
CPC ........ B23K 9/044; B23K 9/125; B23K 9/133; B23K 9/287; B23K 9/324; B23K 35/0261; B23K 35/0244
See application file for complete search history.

(56) References Cited

U.S. PATENT DOCUMENTS

| | | |
|---|---|---|
| 5,855,149 A | 1/1999 | Islam et al. |
| 5,993,554 A | 11/1999 | Keicher et al. |

(Continued)

FOREIGN PATENT DOCUMENTS

JP 2019151951 A 9/2019

OTHER PUBLICATIONS

Final Office Action mailed Jul. 20, 2021. for U.S. Appl. No. 16/290,616, filed Mar. 1, 2019, thirteen pages.

(Continued)

*Primary Examiner* — Brian W Jennison
(74) *Attorney, Agent, or Firm* — Morrison & Foerster LLP

(57) ABSTRACT

A processing head assembly is disclosed. In some examples, the processing head assembly comprises a fabrication energy source; a wire feedstock surrounded by a shield and one or more filler feedstocks surrounded by one or more nozzles. In some examples, the fabrication energy source includes the wire feedstock surrounded by the shield. A method of depositing material on a substrate using a processing head assembly for use with a fabrication energy source; a wire feedstock surrounded by a shield and one or more filler feedstocks surrounded by one or more nozzles is disclosed. In some examples, the method comprises projecting a fabrication energy beam from the fabrication energy source onto the substrate at a spot, projecting the wire feedstock surrounded by the shield onto the substrate at the spot and projecting the one or more filler feedstocks surrounded by the one or more nozzles onto the substrate close to the spot.

10 Claims, 6 Drawing Sheets

(56) References Cited

U.S. PATENT DOCUMENTS

| | | | |
|---|---|---|---|
| 6,209,199 | B1 | 4/2001 | Cornu |
| 6,396,025 | B1 | 5/2002 | Pyritz et al. |
| 6,608,281 | B2 | 8/2003 | Ishide et al. |
| 7,765,022 | B2 | 7/2010 | Mazumder et al. |
| 9,835,114 | B1 | 12/2017 | Gradl |
| 10,322,470 | B2 | 6/2019 | Jones et al. |
| 10,421,142 | B2 | 9/2019 | Stempfer |
| 11,383,316 | B2 | 7/2022 | Hranka |
| 2006/0049153 | A1* | 3/2006 | Cahoon ................. B23K 26/32 219/121.63 |
| 2010/0319900 | A1 | 12/2010 | Abyzov |
| 2014/0246809 | A1 | 9/2014 | Hofmann et al. |
| 2015/0140230 | A1 | 5/2015 | Jones et al. |
| 2015/0298258 | A1 | 10/2015 | Arjakine et al. |
| 2016/0136758 | A1 | 5/2016 | Kawasaki et al. |
| 2017/0120517 | A1 | 5/2017 | Shimoyama |
| 2017/0129180 | A1 | 5/2017 | Coates et al. |
| 2018/0050421 | A1* | 2/2018 | Marchione ............. B23K 26/34 |
| 2018/0073396 | A1 | 3/2018 | Varney |
| 2019/0111509 | A1 | 4/2019 | Hranka |
| 2019/0270137 | A1 | 9/2019 | Hranka |
| 2019/0270254 | A1 | 9/2019 | Mark et al. |

OTHER PUBLICATIONS

Final Office Action mailed Jun. 16, 2021, for U.S. Appl. No. 16/162,217, filed Oct. 16, 2018, five pages.

M.F. Smith, Comparing cold spray with thermal spray coating technologies, Sandia National Laboratories (Year: 2007).

Non-Final Office Action mailed Jan. 22, 2021, for U.S. Appl. No. 16/290,616, filed Mar. 1, 2019, fifteen pages.

Non-Final Office Action mailed Nov. 3, 2021, for U.S. Appl. No. 16/162,217, filed Oct. 16, 2018, five pages.

Non-Final Office Action mailed Oct. 14, 2020, for U.S. Appl. No. 16/162,217, filed Oct. 16, 2018, four pages.

Notice of Allowance mailed Mar. 1, 2022, for U.S. Appl. No. 16/162,217, filed Oct. 16, 2018, eight pages.

Usimm, What are the most common machining techniques, available at https://www.usimm.ca/en/ what-are-the-most-common-machining-techniques/, Published on Mar. 11, 2017 (Year: 2017).

Victor Anusci, Let's talk about WAAM, wire arc additive manufacturing, 3D Printing Media Network, Published Nov. 20, 2017 ( Year: 2017).

* cited by examiner

WIRE ARC HYBRID MANUFACTURING

CROSS REFERENCE TO RELATED APPLICATIONS

This application is a divisional of U.S. application Ser. No. 16/162,217, filed Oct. 16, 2018 and claims the benefit under 35 USC 119(e) of U.S. Provisional Patent Application Nos. 62/572,717 and 62/572,758, filed Oct. 16, 2017, the contents of which are incorporated herein by reference in their entirety for all purposes.

FIELD OF THE DISCLOSURE

This relates generally to methods and systems for additive manufacturing, and more particularly, to methods and systems for creating a complex part using a processing head assembly including a plurality of feedstocks. This also relates to methods and systems for creating a hybrid machine forming a closed loop electrical circuit between a 3D printing tool including a processing head assembly and a CNC machine work holding including an insulator.

BACKGROUND OF THE DISCLOSURE

Subtractive manufacturing is a process by which 3D objects are constructed by successively cutting material away from a solid block of material. Subtractive manufacturing includes a combination of rough fabrication techniques (e.g., casting, rolling, forging, extrusion, and stamping) and finish fabrication techniques (e.g., machining, welding, soldering, polishing) that have been used traditionally to process materials with varying characteristics into desired shapes and assemblies. Subtractive manufacturing can be done by manually cutting the material but is most typically done with a Computer Numerically Controlled (CNC) Machine.

A CNC machine includes lathes, milling machines, grinding machines, and other tool types. More recently, machining centers have been developed, which provide a single machine having multiple tool types and capable of performing multiple different machining processes. Machining centers may generally include one or more tool retainers, such as spindle retainers and turret retainers holding one or more tools, and a workpiece retainer, such as a pair of chucks. The workpiece retainer may be stationary or move (in translation and/or rotation) while a tool is brought into contact with the workpiece, thereby performing a subtractive manufacturing process during which material is removed from the workpiece.

Because of cost, expense, complexity, and other factors, more recently there has been interest in alternative techniques which would allow part or all of the conventional materials fabrication procedures to be replaced by additive manufacturing techniques. In contrast to subtractive manufacturing processes, which focus on precise removal of material from a workpiece, additive manufacturing processes precisely add material, typically in a computer controlled environment. Additive manufacturing techniques improve efficiency and reduce waste as compared to conventional manufacturing techniques. Additionally, additive manufacturing techniques may also expand manufacturing capabilities by permitting seamless construction of complex configurations which, using conventional subtractive manufacturing techniques, would have to be assembled from a plurality of component parts. The opportunity for additive techniques to replace subtractive processes depends on several factors, such as producing an object or part in a required shape, the range of materials available for use in the additive processes, the size and surface finish that can be achieved using additive techniques, and the rate at which material can be added etc.

Additionally, it is not just challenging to form an object or a part in a required shape but also to form an object or a part with a desired combination of metallurgical properties (e.g., various heat treatments, work hardening, complex microstructure etc.). This involves considerable investment in time, tools, and effort. Several different additive techniques such as, laser powder, laser wire, pulsed wire arc etc. are available and they work in different ways, and have varying degrees of capability. Traditionally, many industrial-grade additive manufacturing machines have utilized metal powders. Powder is added to a substrate but as it flows through the propellant supply nozzle, a laser heats the surface of the substrate. One of the key advantages of this process is that complex shapes with high geometrical accuracy of +/−0.05 mm can be manufactured with this type of process which separates this additive manufacturing technology from the others. However, on the downside, porosity has been an historical issue with this process. Also, more importantly, the deposition rate is very low and the fabricated component size is limited to relatively small components. Essentially, powder based additive manufacturing is good for producing a small component with a high definition.

On the other hand, wire arc additive manufacturing uses an electric arc as a heat source and wire—rather than powder—as feedstock. One of the advantages of wire arc additive manufacturing technology is that it can be implemented using off-the-shelf welding equipment. Additionally, this process provides higher deposition rates that make the deposition of large scale parts achievable in reasonable time. Moreover, this process is much cheaper compared to the powder based additive manufacturing technology as welding wire is a cheaper form of feedstock compared to powder. Additionally, there is a wider selection and greater availability of wire products versus powder. However, the disadvantages associated with this process are deformations and residual stresses due to enormous heat input, relatively low dimensional accuracy and rough surface finish of the part.

There is a need for a system that can combine the advantages of wire arc additive manufacturing with powder based additive manufacturing, thereby enabling quick and cheap production of large scale parts with high precision.

Additionally, as mentioned above, even though some additive processes may advantageously be capable of fabricating precision net-shape components ready for use, in other cases, however, the additive process may generate "near-net shape' products that require some degree of finishing. In general, additive and subtractive processing techniques have developed substantially independently, and therefore have overlooked synergies that may result from combining these two distinct types of processes and the apparatus for performing them. While integrating an additive manufacturing 3D printing tool with a subtractive manufacturing CNC machine can create a hybrid system that can quickly and cheaply produce a precise complex part, this integration can be challenging.

SUMMARY

Examples of the disclosure are directed to devices and methods for additive manufacturing. In some examples, methods and systems for creating a complex part using a processing head assembly are disclosed. In some examples, the processing head assembly can include a plurality of feedstocks, a fabrication energy supply and a gas supply. In some examples, a plurality of feedstocks can include one or more wire feedstock and/or one or more powder/propellant supply feedstock. The processing head assembly with a plurality of feedstocks can improve the deposition rate to make the deposition of large-scale parts achievable in reasonable times. In some examples, the plurality of feedstocks can include one or more wire feedstock and one or more powder/propellant supply feedstock. This combination of feedstocks can produce large-scale complex parts with high geometrical accuracy and low porosity in reasonable times. In some examples, methods and systems for creating a hybrid machine forming a closed loop electrical circuit between a 3D printing tool including a processing head assembly and a CNC machine work holding including an insulator are disclosed. The insulator situated between the metal printing tool and the CNC machine helps to protect the CNC machine from electrical discharges that could damage the machines electronics, guide ways and bearings.

DETAILED DESCRIPTION

Figure 1:
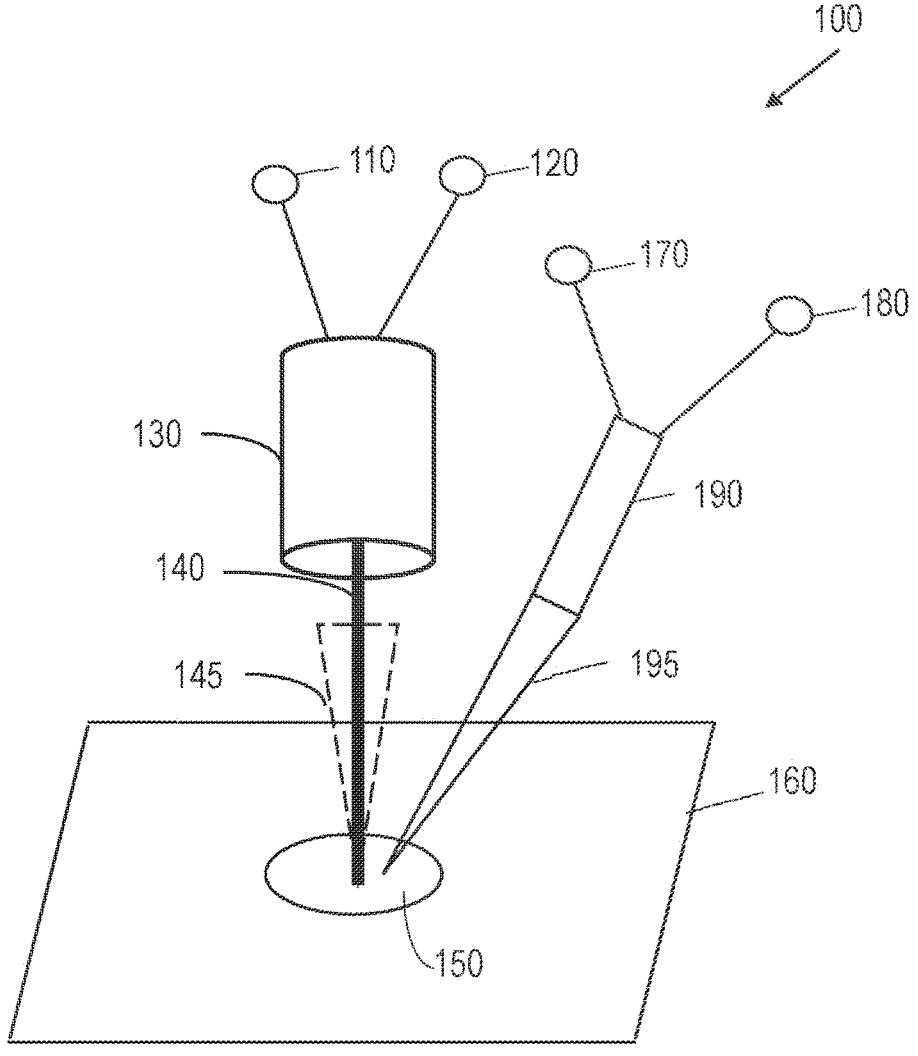
FIG. 1 is a schematic illustration of an exemplary processing head assembly with a main wire for arc and feed wire and an outlet for filler feed powder deposition.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one-step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

Subtractive manufacturing is a process by which 3D objects are constructed by successively cutting material away from a solid block of material. Subtractive manufacturing includes a combination of rough fabrication techniques (e.g., casting, rolling, forging, extrusion, and stamping) and finish fabrication techniques (e.g., machining, welding, soldering, polishing) that have been used traditionally to process materials with varying characteristics into desired shapes and assemblies. Subtractive manufacturing can be done by manually cutting the material but is most typically done with a Computer Numerically Controlled (CNC) Machine.

A CNC machine includes lathes, milling machines, grinding machines, and other tool types. More recently, machining centers have been developed, which provide a single machine having multiple tool types and capable of performing multiple different machining processes. Machining centers may generally include one or more tool retainers, such as spindle retainers and turret retainers holding one or more tools, and a workpiece retainer, such as a pair of chucks. The workpiece retainer may be stationary or move (in translation and/or rotation) while a tool is brought into contact with the workpiece, thereby performing a subtractive manufacturing process during which material is removed from the workpiece.

Because of cost, expense, complexity, and other factors, more recently there has been interest in alternative techniques which would allow part or all of the conventional materials fabrication procedures to be replaced by additive manufacturing techniques. In contrast to subtractive manufacturing processes, which focus on precise removal of material from a workpiece, additive manufacturing processes precisely add material, typically in a computer controlled environment. Additive manufacturing techniques improve efficiency and reduce waste as compared to conventional manufacturing techniques. Additionally, additive manufacturing techniques may also expand manufacturing capabilities by permitting seamless construction of complex configurations which, using conventional subtractive manufacturing techniques, would have to be assembled from a plurality of component parts. The opportunity for additive techniques to replace subtractive processes depends on several factors, such as producing an object or part in a required shape, the range of materials available for use in the additive processes, the size and surface finish that can be achieved using additive techniques, and the rate at which material can be added etc.

Additionally, it is not just challenging to form an object or a part in a required shape but also to form an object or a part with a desired combination of metallurgical properties (e.g., various heat treatments, work hardening, complex microstructure etc.). This involves considerable investment in time, tools, and effort. Several different additive techniques such as, laser powder, laser wire, pulsed wire arc etc. are available and they work in different ways, and have varying degrees of capability. Traditionally, many industrial-grade additive manufacturing machines have utilized metal powders. Powder is added to a substrate but as it flows through the propellant supply nozzle, a laser heats the surface of the substrate. One of the key advantages of this process is that complex shapes with high geometrical accuracy of +/−0.05 mm can be manufactured with this type of process which separates this additive manufacturing technology from the others. However, on the downside, porosity has been an historical issue with this process. Also, more importantly, the deposition rate is very low and the fabricated component size is limited to relatively small components. Essentially, powder based additive manufacturing is good for producing a small component with a high definition.

On the other hand, wire arc additive manufacturing uses an electric arc as a heat source and wire—rather than powder—as feedstock. One of the advantages of wire arc additive manufacturing technology is that it can be implemented using off-the-shelf welding equipment. Additionally, this process provides higher deposition rates that make the deposition of large scale parts achievable in reasonable time. Moreover, this process is much cheaper compared to the powder based additive manufacturing technology as welding wire is a cheaper form of feedstock compared to powder. Additionally, there is a wider selection and greater availability of wire products versus powder. However, the disadvantages associated with this process are deformations and residual stresses due to enormous heat input, relatively low dimensional accuracy and rough surface finish of the part.

There is a need for a system that can combine the advantages of wire arc additive manufacturing with powder based additive manufacturing, thereby enabling quick and cheap production of large scale parts with high precision.

Additionally, as mentioned above, even though some additive processes may advantageously be capable of fabricating precision net-shape components ready for use, in other cases, however, the additive process may generate "near-net shape' products that require some degree of finishing. In general, additive and subtractive processing techniques have developed substantially independently, and therefore have overlooked synergies that may result from combining these two distinct types of processes and the apparatus for performing them. While integrating an additive manufacturing 3D printing tool with a subtractive manufacturing CNC machine can create a hybrid system that can quickly and cheaply produce a precise complex part, this integration can be challenging.

Disclosed herein are devices and methods for additive manufacturing. Any suitable apparatus may be employed in conjunction with the methods disclosed herein.

As mentioned above, a system that can combine the advantages of wire arc additive manufacturing with powder based additive manufacturing can enable quick and cheap production of large scale parts with high precision. Wire is a relatively cheaper feedstock and wire arc enables high deposition rates. Wire arc additive manufacturing assembly is also simpler to implement by integrating a 3D printing tool with a CNC machine which makes it an appealing option in comparison to a traditional expensive powder bed system. Additionally, the current invention can integrate one or more powder feedstock and/or one or more additional wire feedstock to achieve even higher deposition rates to form large complex parts with high definition which can be precision net-shape components ready for use.

Furthermore, an integrated system with wire arc additive manufacturing and powder based additive manufacturing can provide custom alloying capability (metal matrix composites, metal in-situ alloying, etc). Additionally, such an integrated system can also provide a clear advantage in managing stress build up in parts. The wire-arc process, when used alone creates excessive heat that can be detrimental to the additive process via stresses that are accumulated from too much heat input. However, by adding additional "parasitic" feedstock to the melt pool in the form of additional wires or powder filler feedstock, some of this excessive energy can be absorbed, thereby reducing the stress growth and leaning out the heat input/mass input ratio.

Examples of the disclosure are directed to devices and methods for additive manufacturing using wire arc as the energy source. However, it is to be understood that this disclosure extends to using other sources of energy such as laser beam, pulsed wire arc, cold spray, focused thermal energy, pulsed electrical discharge energy, and kinetic energy etc.

FIG. 1 is a schematic illustration of an exemplary processing head assembly with a main wire for arc and feed wire and an outlet for filler feed powder deposition. The processing head assembly 100 can include an energy source 145, such as a laser beam, an electron beam, an ion beam, a cluster beam, a neutral particle beam, a plasma jet, or a simple electrical discharge (arc). In some examples, such as shown in FIG. 1, the energy source 145 can be an arc. In some examples, the energy source 145 can melt a small portion of the growth surface substrate 160, thereby forming a melt-pool 150, without losing substrate material due to evaporation, splattering, erosion, shock-wave interactions, or other dynamic effects. The energy source 145 may be continuous or intermittently pulsed.

In some examples, such as shown in FIG. 1, the processing head assembly 100 can include a wire source and electrical path source 110, a shield gas source 120, a wire feedstock 140, a shield gas outlet 130, and powder/propellant nozzle 190. In some examples, the melt pool 150 may be liquefied material from the substrate 160 as well as the added feed material. In some examples, the feed material may be provided as a feed powder that is directed onto the melt pool 150 in a feed powder/propellant gas mixture 195 exiting nozzle 190. In some examples, the nozzle 190 may fluidly communicate with a feed powder reservoir 180 and a propellant gas reservoir 170. In some examples, the nozzle 190 can create a flow pattern of feed powder/propellant gas mixture 195 that may substantially converge into the melt pool 150. In some examples, feed material may also be provided as a wire feedstock 140 that can be directed onto the melt pool 150. In some examples, the processing head assembly 100 can be moved relative to the substrate 160. In some examples, the processing head assembly 100 can traverse a path that can form a bead layer on the substrate 160. Additional bead layers may be formed adjacent to or on top of the initial bead layer to fabricate solid, three-dimensional objects.

Figure 2:
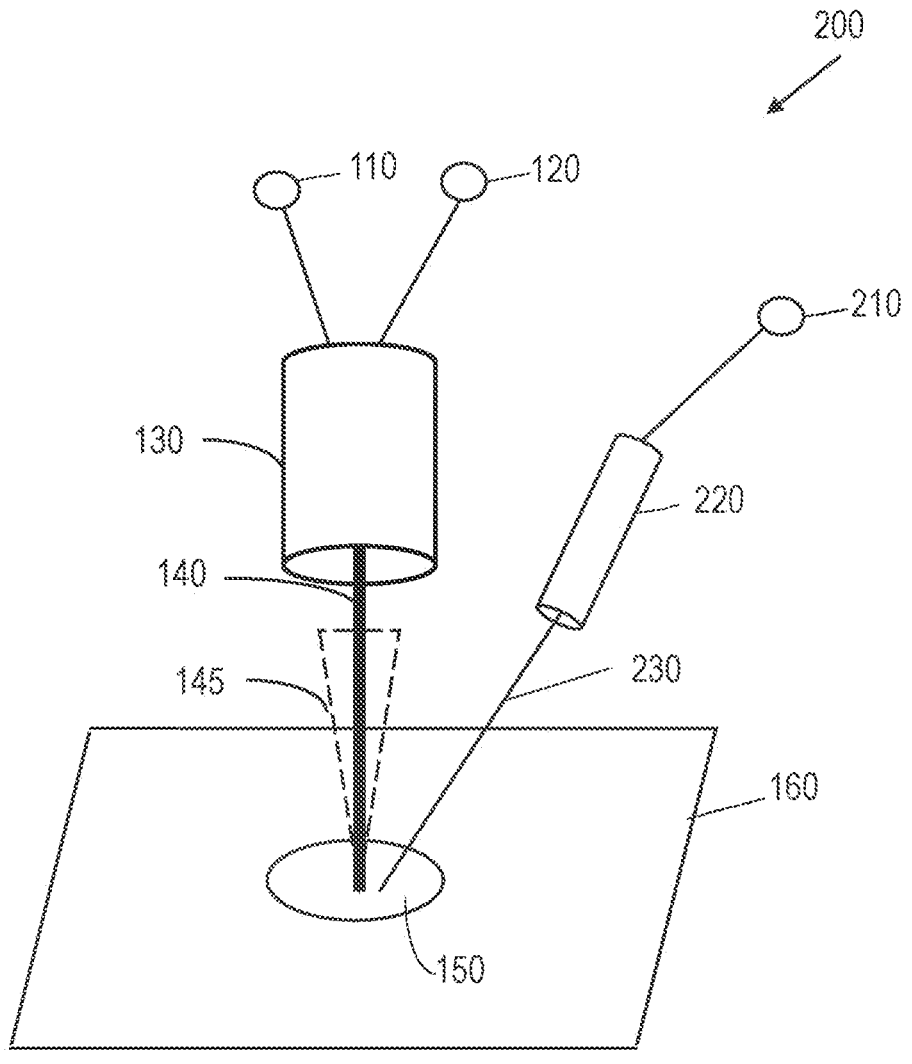
FIG. 2 is a schematic illustration of an exemplary processing head assembly with a main wire for arc and feed wire and an outlet for filler feed wire.

In some examples, the processing head assembly can include a plurality of wire feedstocks to enable quick and cheap production of large scale parts with high precision. For example, FIG. 2 is a schematic illustration of an exemplary processing head assembly with a main wire for arc and feed wire and an outlet for filler feed wire. FIG. 2 shows that the processing head assembly 200 can include a wire source and electrical path source 110, a shield gas source 120, a wire feedstock 140, a shield gas outlet 130, a filler feed wire 230 and a feed filler wire reservoir 210. In some examples, the melt pool 150 may be liquefied material from the substrate 160 as well as the added feed material.

In some examples, feed material may also be provided as a wire feedstock 140 that can be directed onto the melt pool 150. In some examples, such as shown in FIG. 2, the wire arc 145 can serve as the arc energy. In some examples, filler feed material may be provided as a feed wire 230 that is directed onto the melt pool 150 through the exit nozzle 220. In some examples, the wire arc 145 may provide the energy to melt the filler feed wire 230. In some examples, the processing head assembly 200 can be moved relative to the substrate 160. In some examples, the processing head assembly 100 can traverse a path that can form a bead layer on the substrate 160. Additional bead layers may be formed adjacent to or on top of the initial bead layer to fabricate solid, three-dimensional objects.

Figure 3:
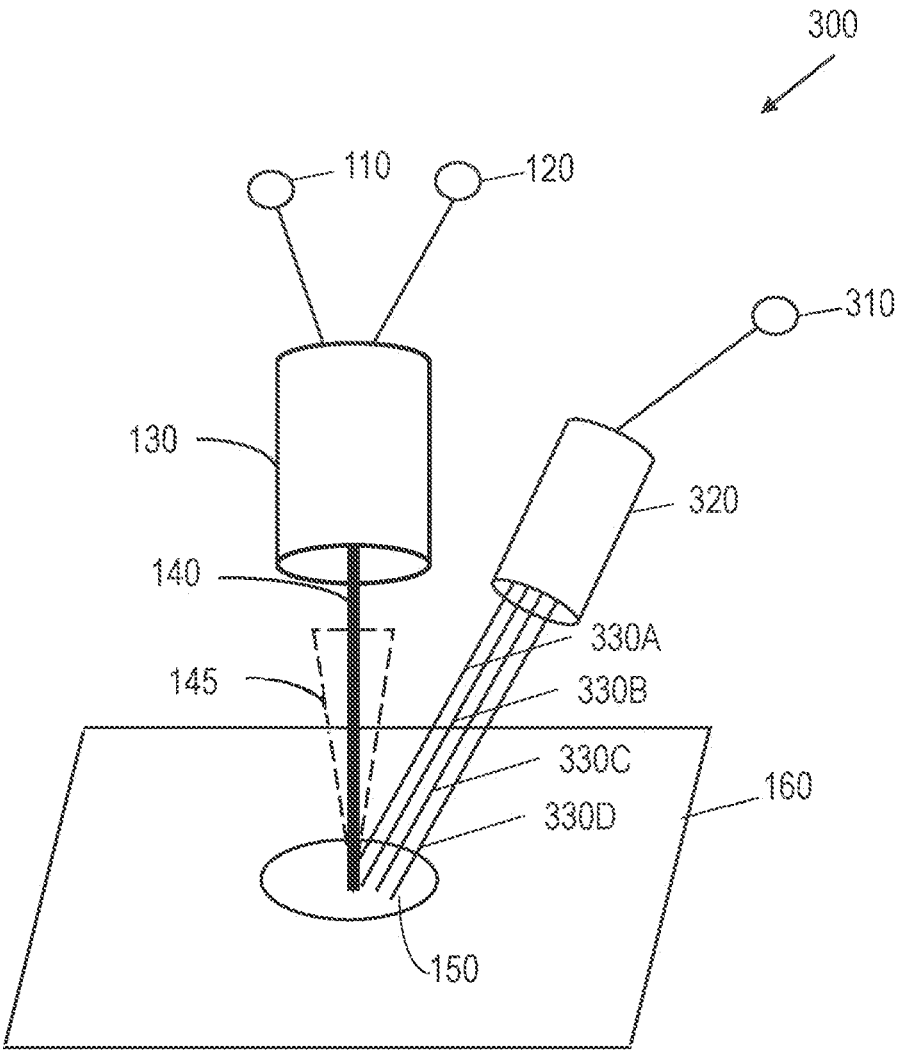
FIG. 3 is a schematic illustration of an exemplary processing head assembly with a main wire for arc and feed wire and a plurality of outlets for filler feed wires.

FIG. 3 is a schematic illustration of an exemplary processing head assembly with a main wire for arc and feed wire and a plurality of outlets for filler feed wires. FIG. 3 shows that the processing head assembly 300 can include a wire source and electrical path source 110, a shield gas source 120, a wire feedstock 140, a shield gas outlet 130, four filler feed wires 330A-D and filler feed wire reservoir 310. In some examples, the melt pool 150 may be liquefied material from the substrate 160 as well as the added feed material. In some examples, such as shown in FIG. 3, the wire arc 145 can serve arc energy. In such examples, the feed material may be provided as a plurality of filler feed wires 330A-D that is directed onto the melt pool 150 through the exit nozzle 320. In some examples, the wire arc 145 may provide the energy to melt the filler feed wires. In some examples, the plurality of filler feed wires can include at least a 2×2 matrix of wires. In some examples, the feed material may be provided as the 2×2 matrix of filler feed wires 330A-D that can be directed onto the melt pool 150 through separate exit nozzles. In some examples, such as shown in FIG. 3, the feed material may be provided as the 2×2 matrix of filler feed wires 330A-D that can be directed onto the melt pool 150 through the same big exit nozzle 320. Furthermore, in some examples, back row of wires from the 2×2 matrix of filler feed wires can be setup higher than front row of wires because the back row of wires may be depositing the feed material on-top of the feed material deposited by the front row of wires. In some examples, the rows may be separated enough to enable some cooling in between. In some examples, the wires from the 2×2 matrix of filler feed wires may slightly overlap. It is to be understood that the 2×2 matrix of filler feed wires may be organized with several different wires positioning to reduce heat input and maximize deposition rates. In some examples, the processing head assembly 300 can be moved relative to the substrate 160. In some examples, the processing head assembly 100 can traverse a path that can form a bead layer on the substrate 160. Additional bead layers may be formed adjacent to or on top of the initial bead layer to fabricate solid, three-dimensional objects.

Figure 4:
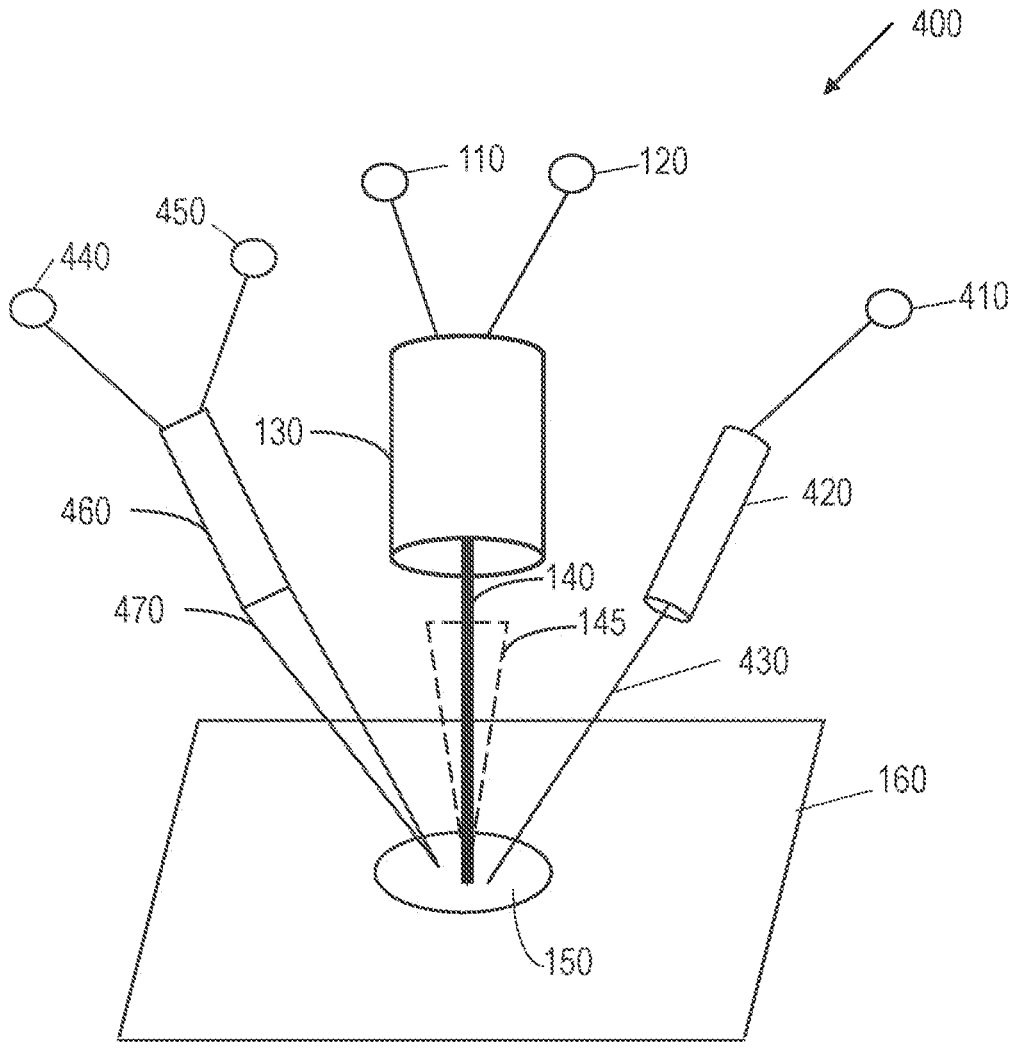
FIG. 4 is a schematic illustration of an exemplary processing head assembly with a main wire for arc and feed wire, an outlet for filler feed wire and an outlet for filler feed powder deposition.

FIG. 4 is a schematic illustration of an exemplary processing head assembly with a main wire for arc and feed wire, an outlet for filler feed wire and an outlet for filler feed powder deposition. In some examples, such as shown in FIG. 4, the processing head assembly 400 can include a wire source and electrical path source 110, a shield gas source 120, a wire feedstock 140, a shield gas outlet 130, and powder/propellant nozzle 460, a filler feed wire 430 and filler feed wire reservoir 410. In some examples, the melt pool 150 may be liquefied material from the substrate 160 as well as the added feed material. In some examples, such as shown in FIG. 4, the wire arc 145 can serve as the arc energy. In some examples, feed material may also be provided as a wire feedstock 140 that can be directed onto the melt pool 150. In some examples, filler feed material may be provided as a feed wire 430 that is directed onto the melt pool 150 through the exit nozzle 420. In some examples, the wire arc 145 may provide the energy to melt the filler feed wire. In some examples, the feed material may also be provided as a feed powder that is directed onto the melt pool 150 in a feed powder/propellant gas mixture 470 exiting nozzle 460. In some examples, the nozzle 460 may fluidly communicate with a feed powder reservoir 450 and a propellant gas reservoir 440. In some examples, the nozzle 460 can create a flow pattern of feed powder/propellant gas mixture 470 that may substantially converge into the melt pool 150. In some examples, the processing head assembly 400 can be moved relative to the substrate 160. In some examples, the processing head assembly 400 can traverse a path that can form a bead layer on the substrate 160. Additional bead layers may be formed adjacent to or on top of the initial bead layer to fabricate solid, three-dimensional objects.

Figure 5:
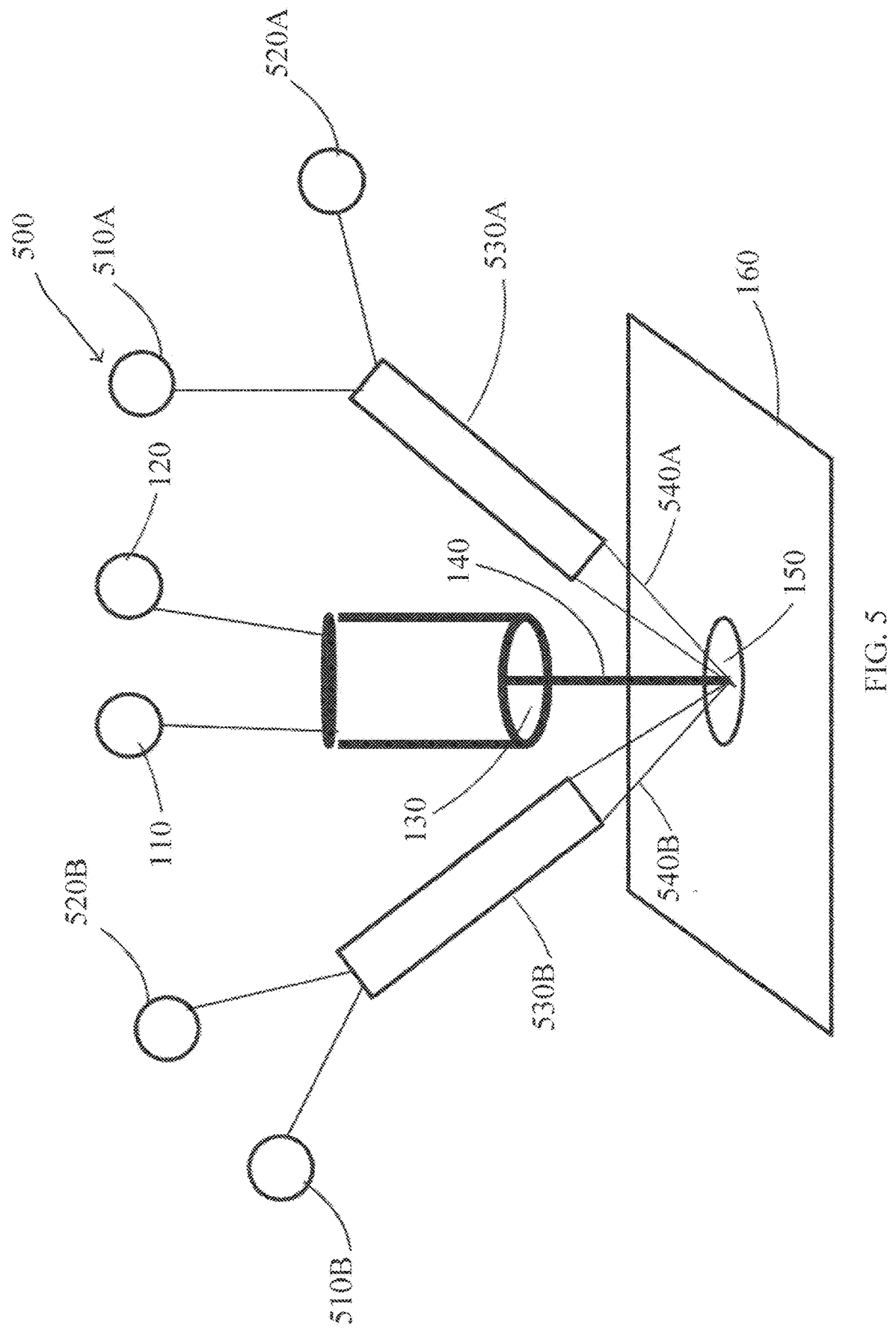
FIG. 5 is a schematic illustration of an exemplary processing head assembly with a main wire for arc and feed wire and a plurality of outlets for filler feed powder deposition.

FIG. 5 is a schematic illustration of an exemplary processing head assembly with a main wire for arc and feed wire and a plurality of outlets for filler feed powder deposition. In some examples, such as shown in FIG. 5, the processing head assembly 500 can include a wire source and electrical path source 110, a shield gas source 120, a wire feedstock 140, a shield gas outlet 130, and powder/propellant nozzles 530A-B. In some examples, the melt pool 150 may be liquefied material from the substrate 160 as well as the added feed material. In some examples, such as shown in FIG. 5, the wire feedstock 140 can be represented as both the arc energy and feed wire. In some examples, feed material may be provided as a wire feedstock 140 that can be directed onto the melt pool 150. In some examples, the feed material may also be provided as feed powder directed onto the melt pool 150 in a plurality of feed powder/propellant gas mixture 540A-B exiting nozzles 530A-B. In some examples, the nozzles 530A-B may fluidly communicate with feed powder reservoirs 520A-B and propellant gas reservoirs 510A-B. In some examples, the nozzles 530A-B can create a flow pattern of feed powder/propellant gas mixture 540A-B that may substantially converge into the melt pool 150. In some examples, the processing head assembly 500 can be moved relative to the substrate 160. In some examples, the processing head assembly 500 can traverse a path that can form a bead layer on the substrate 160. Additional bead layers may be formed adjacent to or on top of the initial bead layer to fabricate solid, three-dimensional objects.

Figure 6:
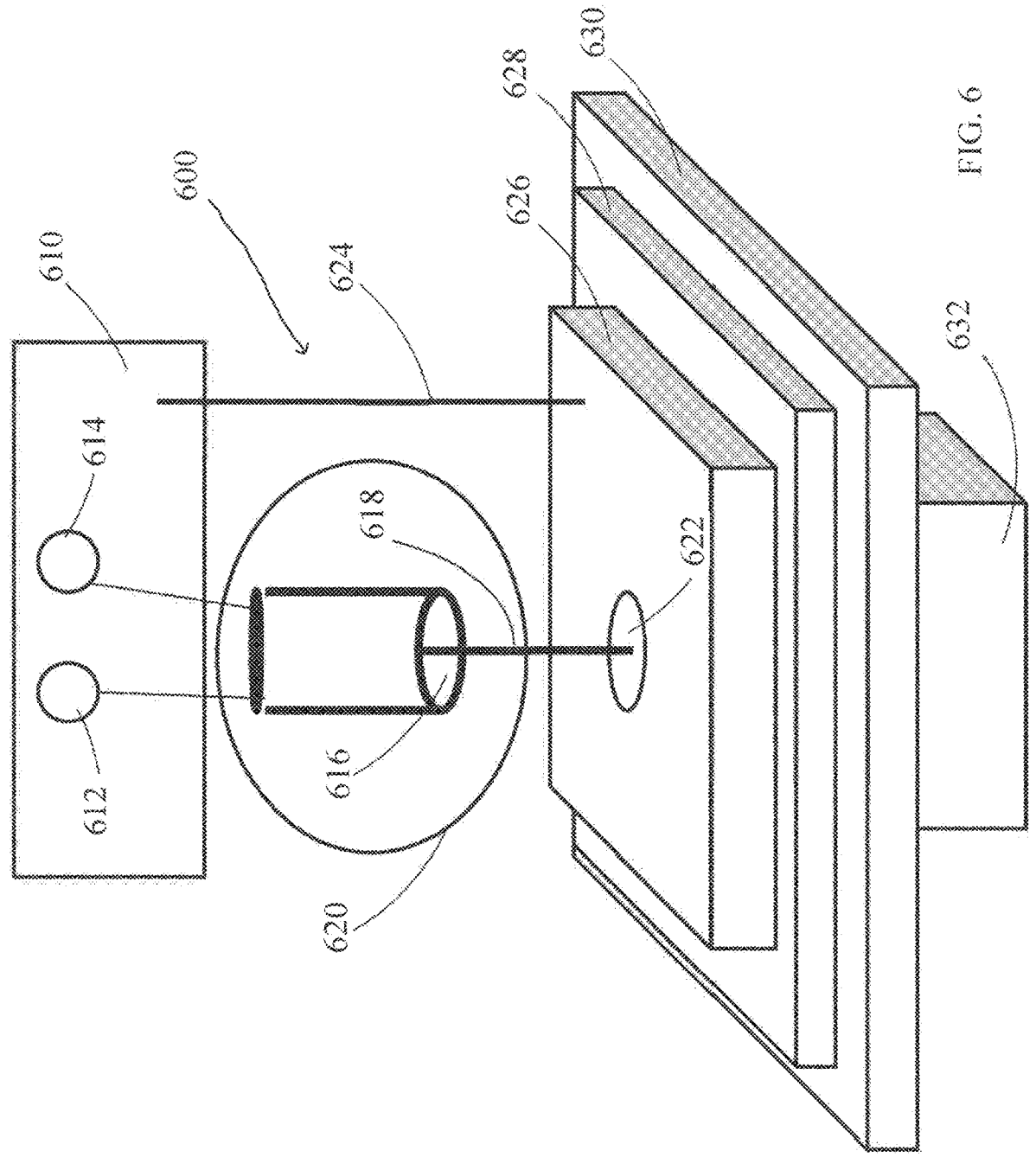
FIG. 6 is a schematic illustration of a grounding system for wire arc process in a CNC machine.

FIG. 6 is a schematic illustration of a grounding system for wire arc process in a CNC machine. As mentioned earlier, even though some additive processes may advantageously be capable of fabricating precision net-shape components ready for use, in other cases, however, the additive process may generate "near-net shape' products that require some degree of finishing. In general, additive and subtractive processing techniques have developed substantially independently, and therefore have overlooked synergies that may result from combining these two distinct types of processes and the apparatus for performing them. While integrating an additive manufacturing 3D printing tool with a subtractive manufacturing CNC machine can create a hybrid system that can quickly and cheaply produce a precise complex part, this integration can be challenging.

For example, wire arc deposition is a process that has recently been used for additive processing. As explained above, it consists of a simple electric discharge source for creating the heat to melt the metal and a wire feed stock. To use the process in a hybrid machine, specific challenges must be overcome to protect the CNC machine from electrical discharges that could damage the machines electronics, guide ways and bearings.

For example, a system, such as one shown in FIG. 6 addresses some of these challenges. FIG. 6 discloses methods and systems for creating a hybrid machine forming a closed loop electrical circuit between a 3D wire arc deposition printing tool including a processing head assembly and a CNC machine work holding including an insulator. The insulator situated between the metal printing tool and the CNC machine helps to protect the CNC machine from electrical discharges that could damage the machines electronics, guide ways and bearings and addresses some of the integration challenges. In some examples, the path of electricity runs from a power generation source through a conductor to the wire-arc tool and through the consumable wire to the point of deposition or melting. In some examples, because CNC machines are fabricated of metal components, it can be easy to find a path of least resistance through the CNC machine rather than through the potentially higher resistance wire. In some examples, for electricity to pass through the moving components, it may pass through sliding metal contacts and roller bearings. In some examples, the electrical discharge can travel through these contacts and can cause material transfer and deterioration of precision surfaces. Because CNC machines rely on these precision surfaces for their repeatable, high precision machining capability, it may be critical to ensure that the process has only one path of least resistance, through the wire. The present disclosure includes utilizing an electrical insulator between the path of electricity and the CNC machine structure.

In some examples, such as shown in FIG. 6, the processing head assembly 600 can be provided with a wire source and electrical path source 612, a shield gas source 614, a wire feedstock 618, and shield gas outlet 616. In some examples, the melt pool 622 may be liquefied material from the substrate 626 as well as the added wire feedstock material 618. In some examples, the wire feedstock material 618 can be directed onto the melt pool 622. In some examples, as the processing head assembly 600 is moved relative to the substrate 626, the assembly can traverse a tool path that can form a bead layer on the substrate 626. In some examples, additional bead layers may be formed adjacent to or on top of the initial bead layer to fabricate solid, three-dimensional objects.

In some examples, the wire arc power source 610 can be electrically conducted and connected via metal wire feedstock material 618 to the substrate 626. In some examples, the wire arc power source 610 can be electrically conducted and connected to the substrate 626 by the grounding wire 624. In some examples, insulator 628 can used in between substrate 626 and machine work/tool holding 630. In some examples, machine work holding 630 is attached to machine foundation 632.

Therefore, according to the above, some examples of the disclosure are directed to a processing head assembly comprising a fabrication energy source; a wire feedstock surrounded by a shield and one or more filler feedstocks surrounded by one or more nozzles. In some examples, the fabrication energy source can include the wire feedstock surrounded by the shield. A method of depositing material on a substrate using a processing head assembly for use with a fabrication energy source; a wire feedstock surrounded by a shield and one or more filler feedstocks surrounded by one or more nozzles is disclosed. In some examples, the method comprises projecting a fabrication energy beam from the fabrication energy source onto the substrate at a spot, projecting the wire feedstock surrounded by the shield onto the substrate at the spot and projecting the one or more filler feedstocks surrounded by the one or more nozzles onto the substrate close to the spot.

In some examples, the one or more filler feedstocks surrounded by the one or more nozzles can include at least one of one or more filler wire feedstocks and one or more filler powder feedstocks. In some examples, the fabrication energy source can provide energy to melt the one or more filler feedstocks. In some examples, the one or more filler feedstocks surrounded by the one or more nozzles can include both of the one or more filler wire feedstocks and the one or more filler powder feedstocks. In some examples, the one or more filler feedstocks surrounded by the one or more nozzles can include a plurality of filler wire feedstocks. In some examples, the one or more filler feedstocks surrounded by the one or more nozzles can include a plurality of filler powder feedstocks. In some examples, the plurality of filler wire feedstocks can be surrounded by a first nozzle of the one or more nozzles. In some examples, the plurality of filler wire feedstocks surrounded by the first nozzle of the one or more nozzles can include a first set of filler wire feedstocks and a second set of filler wire feedstocks and the first set of filler wire feedstocks are setup higher than the second set of filler wire feedstocks inside the first nozzle. In some examples, a first wire of the plurality of filler wire feedstocks can be surrounded by a first nozzle of the one or more nozzles and a second wire of the plurality of filler wire feedstocks is surrounded by a second nozzle of the one or more nozzles. In some examples, a method of depositing material on a substrate using a processing head assembly for use with a fabrication energy source; a wire feedstock surrounded by a shield and one or more filler feedstocks surrounded by one or more nozzles is disclosed. In some examples, the method comprises projecting a fabrication energy beam from the fabrication energy source onto the substrate at a spot, projecting the wire feedstock surrounded by the shield onto the substrate at the spot, and projecting the one or more filler feedstocks surrounded by the one or more nozzles onto the substrate close to the spot.

In some examples, a machine tool coupled to a processing head assembly is disclosed. In some examples, the machine tool comprises a tool holder carrying a substrate; an insulator in between the tool holder and the substrate and a processing head assembly. In some examples, the processing head assembly comprises a fabrication energy source; a wire feedstock surrounded by a shield and one or more filler feedstocks surrounded by one or more nozzles. In some examples, the fabrication energy source includes the wire feedstock surrounded by the shield.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of depositing material on a substrate using a processing head assembly, the method comprising:

projecting an arc energy beam from an arc energy source of the processing head assembly onto the substrate at a spot;

projecting a wire feedstock surrounded by a shield onto the substrate at the spot, the wire feedstock disposed along a central axis of the processing head assembly and coupled to the electric arc energy source; and projecting two or more powder feedstocks arranged coaxially with the wire feedstock onto the substrate close to the spot, each powder feedstock surrounded by a corresponding nozzle.

2. The method of claim 1, further comprising, melting the wire feedstock and the two or more powder feedstocks using the arc energy beam from the arc energy source.

3. The method of claim 1, wherein projecting the arc energy beam comprises conducting energy from the arc energy source by the wire feedstock toward the substrate.

4. The method of claim 1, further comprising melting a plurality of filler wire feedstocks disposed around the wire feedstock using the arc energy beam from the arc energy source, the plurality of filler wire feedstocks surrounded by one or more wire feedstock nozzles.

5. The method of claim 4, wherein one or more of the plurality of filler wire feedstocks are surrounded by a first nozzle of the one or more wire feedstock nozzles.

6. The method of claim 4, wherein a first wire of the plurality of filler wire feedstocks is surrounded by a first nozzle of the one or more wire feedstock nozzles and a second wire of the plurality of filler wire feedstocks is surrounded by a second nozzle of the one or more wire feedstock nozzles.

7. The method of claim 5, wherein melting the plurality of filler wire feedstocks comprises melting a first set of filler wire feedstocks of the plurality of filler wire feedstocks and a second set of filler wire feedstocks of the plurality of filler wire feedstocks, wherein the first set of filler wire feedstocks are positioned higher than the second set of filler wire feedstocks inside the first nozzle.

8. The method of claim 7, further comprising cooling material from the second set of filler wire feedstocks prior to deposition of the material from the first set of filler wire feedstocks.

9. The method of claim 1, wherein the substrate comprises a melt pool, and wherein the method further comprises melting a portion of the wire feedstock using the arc energy beam from the electric arc energy source before reaching the melt pool.

10. The method of claim 1, further comprising moving the processing head assembly relative to the substrate to deposit a layer of material on the substrate.

* * * * *